US00RE41536E

(19) United States
(12) Reissued Patent
Hagelstein et al.

(10) Patent Number: US RE41,536 E
(45) Date of Reissued Patent: Aug. 17, 2010

(54) INJECTION MOLDING APPARATUS HAVING AN ELONGATED NOZZLE INCORPORATING MULTIPLE NOZZLE BODIES IN TANDEM

(75) Inventors: Hans Hagelstein, Bischweier (DE); Andreas Schrom, Forbach/Bermersbach (DE); Denis Babin, Georgetown, CA (US); Gino Colonico, Georgetown, CA (US)

(73) Assignee: Mold-Masters (2007) Limited, Georgetown (CA)

(21) Appl. No.: 12/351,770

(22) Filed: Jan. 9, 2009

Related U.S. Patent Documents

Reissue of:
(64) Patent No.: 7,160,100
Issued: Jan. 9, 2007
Appl. No.: 10/751,507
Filed: Jan. 6, 2004

(51) Int. Cl.
*B29C 45/20* (2006.01)

(52) U.S. Cl. ..... 425/549
(58) Field of Classification Search ..... 425/549
See application file for complete search history.

(56) References Cited

U.S. PATENT DOCUMENTS

| | | | |
|---|---|---|---|
| 3,677,682 | A | 7/1972 | Putkowski |
| 3,812,323 | A | 5/1974 | Pink |
| 3,843,295 | A | 10/1974 | Greenberg et al. |
| 4,230,934 | A | 10/1980 | ter Beek et al. |
| 4,344,750 | A | 8/1982 | Gellert |
| 4,370,115 | A | 1/1983 | Miura |
| 4,517,453 | A | 5/1985 | Tsutsumi |
| 4,557,685 | A | 12/1985 | Gellert |
| 4,576,567 | A | 3/1986 | Gellert |
| 4,662,837 | A | 5/1987 | Anderson |
| 4,678,426 | A | 7/1987 | Stauber |
| 4,795,338 | A | 1/1989 | Gellert |
| 4,818,217 | A | 4/1989 | Schmidt et al. |
| 4,836,766 | A | 6/1989 | Gellert |
| 4,875,845 | A | 10/1989 | Hara et al. |
| 4,875,848 | A | 10/1989 | Gellert |
| 4,892,474 | A | 1/1990 | Gellert |
| 4,899,288 | A | 2/1990 | Tsutsumi |
| 4,902,218 | A | 2/1990 | Leonard et al. |
| 4,945,630 | A | 8/1990 | Gellert |
| 4,981,431 | A | 1/1991 | Schmidt |
| 5,028,227 | A | 7/1991 | Gellert et al. |
| 5,046,942 | A | 9/1991 | Gellert |
| 5,051,086 | A | 9/1991 | Gellert |
| 5,061,174 | A | 10/1991 | Gellert |
| 5,125,827 | A | 6/1992 | Gellert |

(Continued)

FOREIGN PATENT DOCUMENTS

AU 452137 B2 3/1973

(Continued)

OTHER PUBLICATIONS

U.S. Appl. No. 60/460,417, filed Apr. 7, 2003, Olaru.*

(Continued)

*Primary Examiner*—Tim Heitbrink
(74) *Attorney, Agent, or Firm*—Medler Ferro PLLC

(57) ABSTRACT

The present invention generally relates to an injection molding apparatus, comprising a manifold including a plurality of manifold channels and a plurality of nozzles. Each of the nozzles defines a nozzle channel in fluid communication with one of the manifold channels and including a plurality of nozzle bodies coupled in tandem by a removable and secure connection. The nozzle bodies include at least a upstream nozzle body and a downstream nozzle body. The upstream nozzle body has an upstream end adjacent said manifold channel, and the downstream nozzle body has a downstream end adjacent a mold plate. A removable nozzle tip is retained in a downstream end of each downstream nozzle body. The nozzles also include a plurality of heaters, wherein at least one heater is embedded into each nozzle body.

67 Claims, 10 Drawing Sheets

U.S. PATENT DOCUMENTS

| | | | |
|---|---|---|---|
| 5,135,377 | A | 8/1992 | Gellert |
| 5,225,211 | A | 7/1993 | Imaida et al. |
| 5,232,710 | A | 8/1993 | Miyazawa et al. |
| 5,268,184 | A | 12/1993 | Gellert |
| 5,299,928 | A | 4/1994 | Gellert |
| 5,316,468 | A | 5/1994 | Gunther |
| 5,320,513 | A | 6/1994 | Schmidt |
| 5,421,716 | A | 6/1995 | Gellert |
| 5,494,433 | A | 2/1996 | Gellert |
| 5,507,637 | A | 4/1996 | Schad et al. |
| 5,518,389 | A | 5/1996 | Nonomura et al. |
| 5,536,165 | A | 7/1996 | Gellert |
| 5,591,465 | A | 1/1997 | Babin |
| 5,609,893 | A | 3/1997 | Eastwood |
| 5,820,803 | A | 10/1998 | Hashimoto |
| 5,820,899 | A | 10/1998 | Gellert |
| 5,871,786 | A | 2/1999 | Hume et al. |
| 5,879,727 | A | 3/1999 | Puri |
| 5,894,025 | A | 4/1999 | Lee et al. |
| 5,952,016 | A | 9/1999 | Gellert |
| 6,095,790 | A | 8/2000 | Gellert et al. |
| 6,230,384 | B1 | 5/2001 | Gellert et al. |
| 6,261,083 | B1 | 7/2001 | Stern |
| 6,305,923 | B1 | 10/2001 | Godwin et al. |
| 6,447,283 | B1 | 9/2002 | Gellert |
| 6,666,675 | B2 | 12/2003 | Ihara et al. |
| 6,712,597 | B1 | 3/2004 | Van Boekel |
| 6,789,745 | B1 | 9/2004 | Babin et al. |
| 6,921,257 | B2 | 7/2005 | Olaru |
| 7,118,703 | B2 | 10/2006 | Trudeau |
| 7,121,820 | B2 | 10/2006 | Tooman et al. |
| 7,131,833 | B2 | 11/2006 | Babin |
| 7,137,806 | B2 | 11/2006 | Babin et al. |
| 7,179,081 | B2 | 2/2007 | Sicilla et al. |
| 7,252,498 | B2 | 8/2007 | Olaru |
| 7,306,454 | B2 | 12/2007 | Babin et al. |
| 7,462,030 | B2 | 12/2008 | Fischer et al. |
| 2004/0005380 | A1 | 1/2004 | Babin et al. |
| 2004/0101589 | A1 | 5/2004 | Babin |
| 2004/0166194 | A1 | 8/2004 | Trudeau |
| 2004/0197437 | A1 | 10/2004 | Olaru |
| 2005/0019444 | A1 | 1/2005 | Sicilla et al. |
| 2005/0100625 | A1 | 5/2005 | Tooman et al. |
| 2005/0147713 | A1 | 7/2005 | Hagelstein et al. |
| 2005/0225000 | A1 | 10/2005 | Tabassi |
| 2005/0226956 | A1 | 10/2005 | Fischer et al. |

FOREIGN PATENT DOCUMENTS

| | | | |
|---|---|---|---|
| DE | 86 18 162 | U1 | 10/1986 |
| DE | 86 20 956 | U1 | 1/1987 |
| DE | 40 05 437 | | 8/1991 |
| DE | 4005437 | C2 | 5/1992 |
| DE | 43 12 153 | A1 | 12/1994 |
| DE | 43 24 027 | A1 | 1/1995 |
| DE | 4404894 | C1 | 1/1995 |
| DE | 44 04 894 | C1 | 1/1995 |
| DE | 103 33 206 | A1 | 4/2004 |
| EP | 0 438 739 | A1 | 7/1991 |
| EP | 0 438 739 | B1 | 7/1991 |
| EP | 0 443 203 | A2 | 8/1991 |
| EP | 0 443 203 | A3 | 8/1991 |
| EP | 0 443 203 | B1 | 8/1991 |
| EP | 0 583 601 | A1 | 2/1994 |
| EP | 0443203 | B1 | 8/1994 |
| EP | 0 995 574 | B1 | 4/2000 |
| EP | 0 995 574 | A1 | 4/2000 |
| EP | 0 835 176 | B1 | 5/2000 |
| EP | 1 148 985 | B1 | 10/2001 |
| EP | 1244541 | B1 | 10/2004 |
| EP | 1466715 | A1 | 10/2004 |
| FR | 2641227 | A1 | 7/1990 |
| JP | 60-110416 | A | 6/1985 |
| JP | 63-202418 | A | 8/1988 |
| JP | 2-112919 | A | 4/1990 |
| JP | 9-123222 | A | 5/1997 |
| JP | 11-58448 | A | 3/1999 |
| JP | 2002-331552 | A | 11/2002 |
| JP | 2003-276057 | A | 10/2003 |
| JP | 2005-132026 | A | 5/2005 |
| KR | 10-2006-0032979 | A | 4/2006 |
| WO | WO-95/05930 | A1 | 3/1995 |
| WO | WO-00/46008 | A1 | 8/2000 |
| WO | WO-01/15884 | A3 | 3/2001 |
| WO | WO-01/15884 | A2 | 3/2001 |
| WO | WO-03/080315 | A1 | 10/2003 |

OTHER PUBLICATIONS

"AuBenbeheizte HeiBkanalduse, 230 V. fur schnelle Farbwechsel (with translation)", *Ewikon Brochure*, Oct. 2000.
"Automotive Hotrunners", *Mold Hot Runners Solutions, Inc. Product Information*, Jul. 2002.
"HPS III–NV Valve Gate Systems", *Ewikon Brochure* Jun. , 2001.
"PSG Brochure", Date Unknown.
Lohl, R., "Standardisiertas Schmelzeleitsystem fur Grobwerkzeuge", *Plastverarbeiter* 38 Jahrgang 1987.
U.S. Appl. No. 60/460,418, filed Apr. 7, 2003, Sicilia et al.
U.S. Appl. No. 60/468,973, filed May 9, 2003, Olaru.
U.S. Appl. No. 60/559,977, filed Apr. 7, 2004, Fischer et al.
U.S. Appl. No. 10,819,165, filed Apr. 7, 2004, Sicila et al.
U.S. Appl. No. 60/559,976, filed Apr. 7, 2004, Tabassi.
U.S. Appl. No. 10/819,267, Apr. 7, 2004, Olaru.
Mold Hot Runner Solutions Product Information entitled "Automotive Hotrunners," Mold Hot Runner Solutions, Inc., Jul. 2002.

* cited by examiner

INJECTION MOLDING APPARATUS HAVING AN ELONGATED NOZZLE INCORPORATING MULTIPLE NOZZLE BODIES IN TANDEM

Matter enclosed in heavy brackets [ ] appears in the original patent but forms no part of this reissue specification; matter printed in italics indicates the additions made by reissue.

FIELD OF THE INVENTION

This invention relates generally to an injection molding apparatus having an elongated nozzle incorporating multiple nozzle bodies arranged in tandem.

BACKGROUND OF THE INVENTION

As is well known in the art, hot runner injection molding systems include a manifold for conveying pressurized melt from an inlet to one or more manifold outlets. An injection molding apparatus may also include a nozzle having two nozzles bodies. An example of an injection molding apparatus having two nozzle bodies in tandem can be found in U.S. Pat. No. 4,818,217 to Schmidt et al., which is incorporated herein by reference in its entirety. In particular, these nozzles are used in situations where it is desirable to have a longer nozzle from a conventional nozzle, or an extended nozzle. For example, an extended nozzle may be used when the injection of the plastic and the ejection of the product are mounted on the same side of the mold. Another environment where extended nozzles may be useful is when multiple split molds are used with a single hot runner manifold. This type of apparatus is generally described in U.S. Pat. No. 3,843,295 to Greenberg et al., which is incorporated herein by reference in its entirety.

Thermal expansion can cause tandem nozzles to expand, causing a downstream nozzle to push against an adjacent mold plate. One solution to this problem is to have one nozzle telescope inside another to form a sliding interface between the two nozzles. Thus, as the nozzles thermally expand, the interface between the nozzles can adapt to account for the thermal expansion. However, such an interface between the nozzles can cause leakage, particularly when thermal expansion causes shifting between the two nozzles.

Further, melt flowing through a nozzle channel provides best results when maintained at a consistent temperature. Thus, a heater is generally provided for a nozzle along its length to control the temperature of the melt.

BRIEF SUMMARY OF THE INVENTION

The present invention is directed towards an injection molding apparatus having at least one elongated nozzle comprising at least two nozzle bodies connected in tandem. In particular, one aspect of the present invention is an injection molding apparatus comprising a hot runner manifold including at least two manifold channels and at least two nozzles. Each nozzle defines a nozzle channel in fluid communication with one of the manifold channels. At least one of the nozzles includes at least two nozzle bodies removably fastened in tandem, including at least an upstream nozzle body, having an upstream end adjacent said manifold channel, and a downstream nozzle body, having a downstream end adjacent a mold plate. A separate and removable nozzle tip is retained in a downstream end of the downstream nozzle body. The advantage of having a nozzle tip in a downstream end of a downstream nozzle body is that pressure created by thermal expansion affects the nozzle tip, which is more easily replaced than a downstream nozzle body. Further, the nozzle tip may provide relief from this pressure by having an extended portion which is slidably positioned adjacent the mold plate, such that the nozzle tip may slide with respect to the mold plate upon thermal expansion. The pressure may alternatively be relieved by having the upstream end of the upstream nozzle slidably positioned adjacent the manifold.

In another aspect of the present invention, each of the nozzle bodies includes at least one heater attached thereto. However, each nozzle tip does not have a separate heater connected directly thereto. The nozzle tip receives adequate heat from the heater attached to the adjacent nozzle body to maintain the temperature of the melt stream as it leaves the nozzle. A nozzle tip without a heater has the advantage of being easily replaced due to wear caused by thermal expansion, without the need for disconnecting electrical connections to a heater specifically for the nozzle tip.

In yet another aspect of the present invention, each of the nozzle bodies of a nozzle of an injection molding apparatus includes at least a first heater and a second heater, wherein at least the first heater is embedded into the nozzle body. Further, the second heater may either be embedded into the nozzle or embedded in a heating band coupled to the nozzle. Additional heaters provide for more even temperature control along a nozzle.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings.

DETAILED DESCRIPTION OF THE INVENTION

Figure 1A:
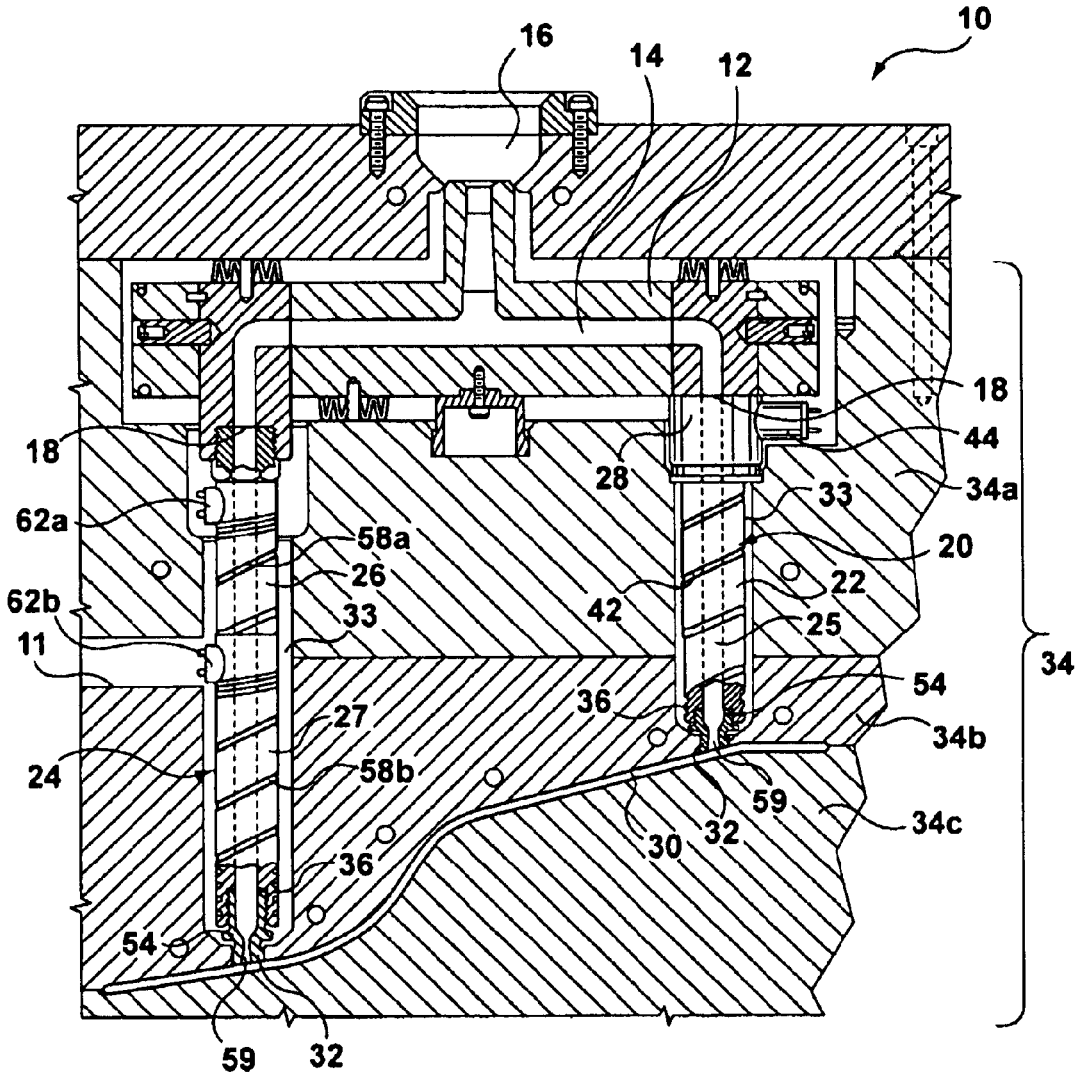
FIG. 1A illustrates an injection molding apparatus, with nozzles of various lengths having either a single or multiple nozzle bodies.

The present invention is directed towards an injection molding apparatus having a nozzle with multiple nozzle bodies arranged in tandem. FIG. 1A shows an injection molding apparatus 10 of the present invention. The injection molding apparatus 10 comprises a manifold 12 having a manifold channel 14 extending therethrough. A manifold bushing 16 is located at an inlet of the manifold channel 14 to receive a melt stream of moldable material from a machine nozzle (not shown) and to deliver the melt stream to manifold outlets 18. A heating element (not shown) heats manifold 12 to maintain the melt stream at a desired temperature. The heating element of the manifold may be embedded into or attached to a surface of the manifold 12.

FIG. 1A shows a first nozzle 20 and a second nozzle 24, each positioned in an opening 33 formed in mold plates 34a and 34b of a split mold plate 34. Nozzles 20 and 24 are positioned between the manifold 12 and a respective mold cavity 30, which is defined by mold plates 34b and 34c of split mold plate 34. Nozzle 20 includes a single nozzle body 22 having an upstream nozzle head 28 and a downstream nozzle end 32. A nozzle channel 25 (shown in shadow) extends through nozzle 20 for delivering the melt stream from one manifold outlet 18 to the corresponding mold cavity 30 through a mold gate 59. Nozzle 20 is further provided with a single heater 42, which helps to maintain the melt stream at a desired temperature as it passes through nozzle 20. Heater 42 is powered through an electrical connector 44 that is in communication via leads (not shown) to a power source (not shown) external to injection molding apparatus 10. Nozzle 20 also includes a nozzle tip 54 retained in a downstream end 32 of nozzle 20 via a threaded connection 36 with nozzle body 22.

FIG. 1A also shows a second nozzle 24 that includes two nozzle bodies, an upstream nozzle body 26 and a downstream nozzle body 27, for delivering a melt stream from a manifold outlet 18 to mold cavity 30. Upstream nozzle body 26 and downstream nozzle body 27 are connected by a removable, yet secure connection (not shown), such as a threaded connection. The mold cavity adjacent nozzle 24 may be a different section of the same mold cavity as that into which melt is delivery via nozzle 20, as shown by mold cavity 30 in FIG. 1A. Alternatively, nozzle 24 may be adjacent a different mold cavity than nozzle 20. Upstream nozzle body 26 includes a first heater 58a powered through a first electrical connector 62a. Downstream nozzle body 27 includes a second heater 58b, powered through a second electrical connector 62b. Leads (not shown) for electrical connector 62b may be drawn through a bore 11 positioned between mold plates 34a and 34b. In an alternate embodiment, lead for the electrical connection to a heater in a downstream nozzle body may be drawn along the nozzle through opening 33 formed in split mold plate 34. In this case, the leads exit the injection molding apparatus near an upstream end of the nozzle, as shown in FIGS. 4, 5A, 5B, 6 and 7, which are each discussed in detail below. Nozzle 24 also includes a nozzle tip 54 retained in a downstream end 32 of the downstream nozzle body 27 via a threaded connection 36.

Mold gates 59 are provided at the entrance to the mold cavity 30. The mold gates 59 are selectively openable to allow melt to be delivered to the mold cavities 30. Nozzles 20 and 24 may be thermal gated or valve gated (discussed further with respect to FIG. 2). Each manifold outlet leads to a nozzle which, in turn, extends to the mold gate of an injection mold cavity. Manifolds have various configurations, depending upon the number and arrangement of the nozzles and the corresponding injection mold cavities. For example, a manifold heater may be located in a variety of locations, as is known by those skilled in the art.

Figure 1B:
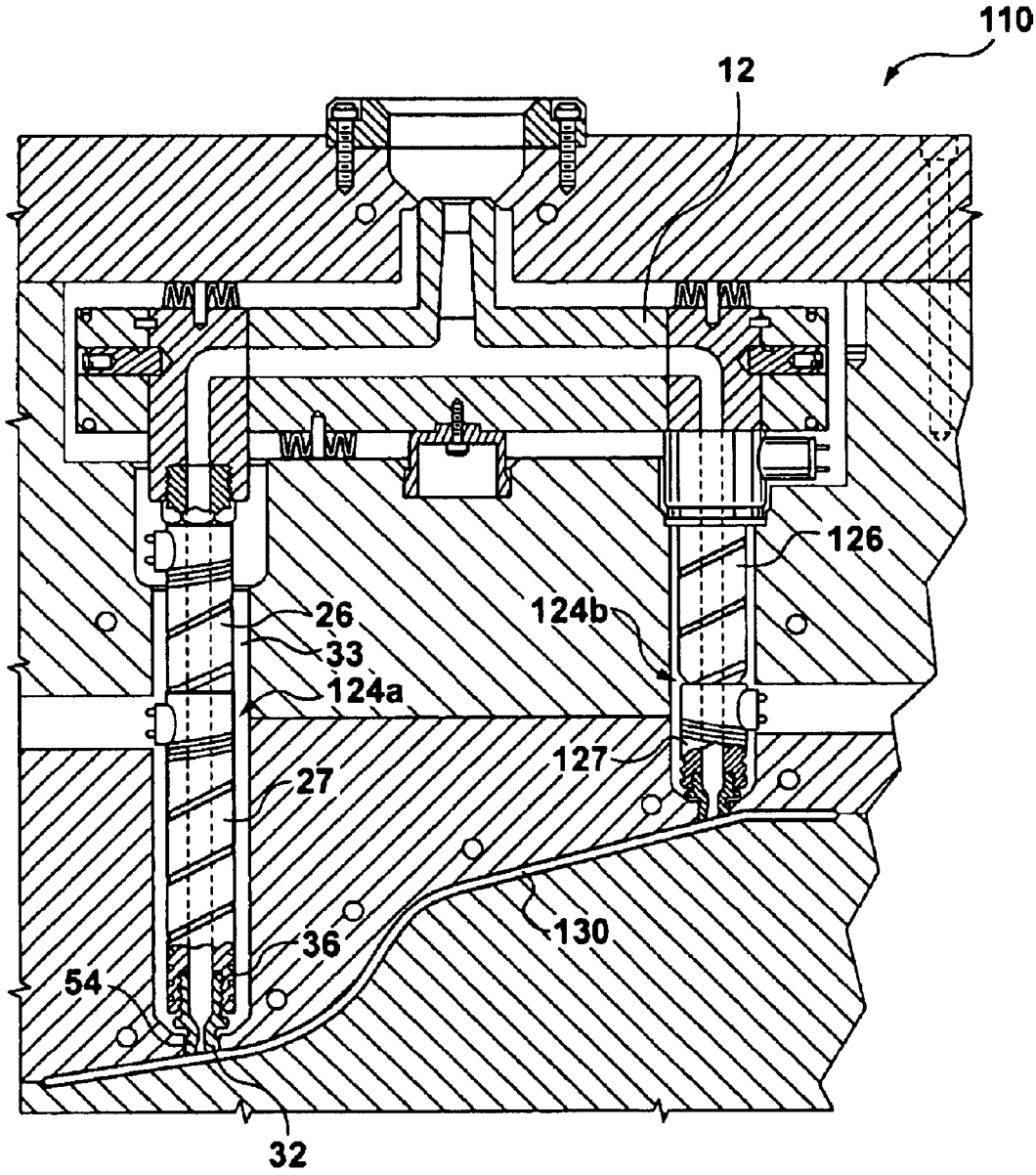
FIG. 1B illustrates an alternate embodiment of an injection molding apparatus, with nozzles of various lengths having various sized multiple nozzle bodies.

FIG. 1B illustrates an alternate embodiment of an injection molding apparatus 110. The embodiment of FIG. 1B includes a first nozzle 124a which is identical to nozzle 24 described above in FIG. 1A, including an upstream nozzle body 26 securely connected to a downstream nozzle body 27, preferably via a threaded connection. Downstream nozzle body 27 includes a nozzle tip 54 retained in a downstream end 32 by a threaded connection 36. Injection molding apparatus 110 also includes a second nozzle 124b which also includes an upstream nozzle body 126 and a downstream nozzle body 127. However, as seen with downstream nozzle body 127, the lengths of upstream and downstream nozzle bodies 126 and 127 may be varied to create several different nozzle lengths. Thus, the particular nozzle lengths may be customized by adding or removing nozzle bodies of various lengths. In FIG. 1B, upstream nozzle bodies 26 and 126 are slightly different lengths and have different connections to manifold 12, which are discussed in detail below. However, an injection molding apparatus of the present invention may alternatively have a uniform length for all upstream nozzle bodies and a different length of downstream nozzle bodies to customize the apparatus for a particular mold.

Figure 2:
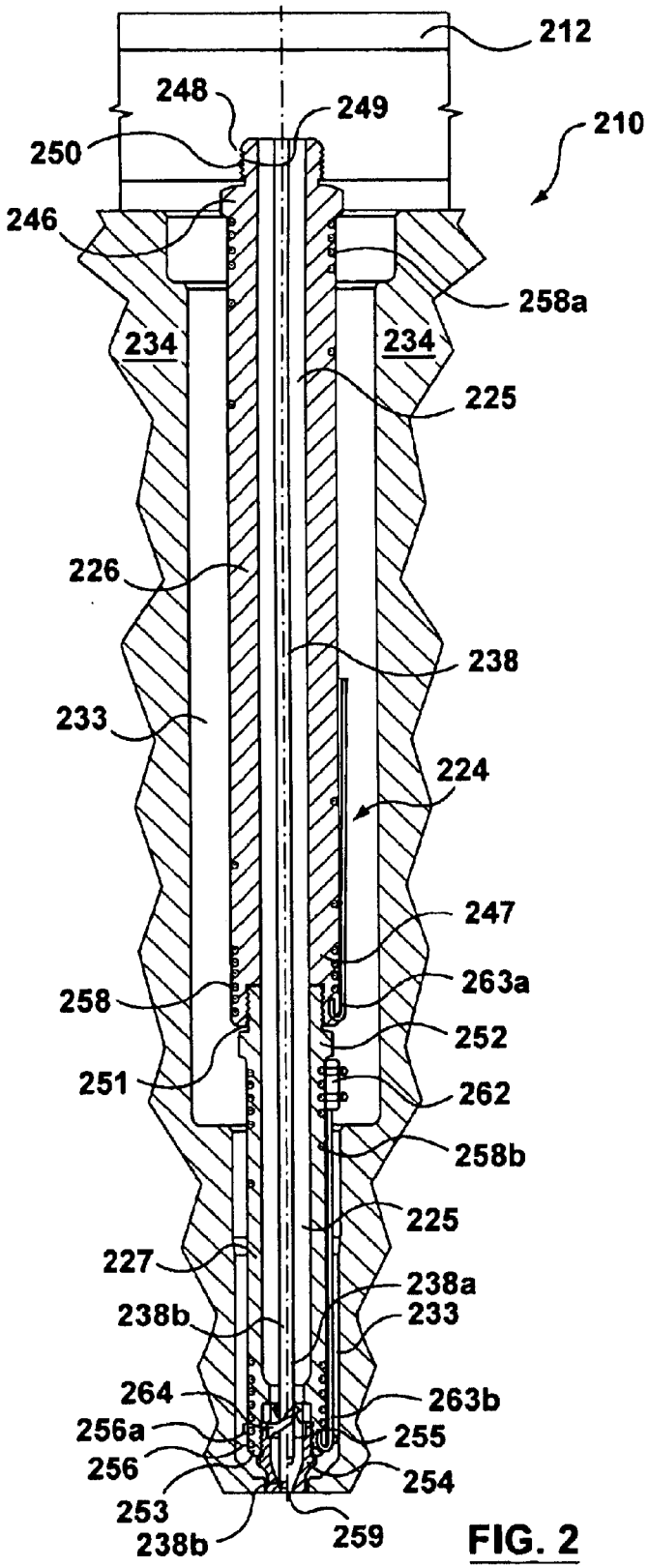
FIG. 2 illustrates a schematic cross-section of a portion of an injection molding apparatus of the present invention including a nozzle having tandem nozzle bodies.

FIG. 2 shows a portion of an injection molding apparatus 210 of the present invention, including a manifold 212 and a nozzle 224, which is generally positioned within an opening 233 in a mold plate 234. In FIG. 2, nozzle 224 has at least an upstream nozzle body 226 and a downstream nozzle body 227, which define a nozzle channel 225 in fluid communication with a manifold channel (not shown) in manifold 212. Upstream nozzle body 226 may be made from the same material as downstream nozzle body 227, or it may be made from a different material than downstream nozzle body 227. Generally, upstream and downstream nozzle bodies 226 and 227 are made from the same tool steel, H13 or stainless steel.

Upstream nozzle body 226 has an upstream end 246 and a downstream end 247. Upstream end 246 is shown in FIG. 2 coupled to manifold 212 via a removable secure connection 248. In particular, connection 248 includes upstream end 246 having a first set of threads 249 and the manifold 212 having a second set of threads 250, which interlock to fasten upstream nozzle body 226 to manifold 212.

FIG. 2 shows a threaded connection 251 coupling downstream end 247 of upstream nozzle body 226 to an upstream end 252 of downstream nozzle body 227, similar to threaded connection 248. Threaded connection 251 is removable so that downstream nozzle 227 may be replaced if damaged or if a different length is required. As discussed above with respect to FIG. 1B, nozzle bodies of other lengths, either longer or shorter, may be coupled together to provide a customized nozzle 224 of a particularly desired length, such that a single manifold may utilize several different nozzles of various lengths. Further, a threaded connection is a secure connection created by interlocking threads, reducing leakage between upstream nozzle 226 and downstream nozzle 227.

A removable nozzle tip 254 is inserted into a downstream end 253 of downstream nozzle body 227 and retained by a threaded connection 255 with the downstream end 253 of downstream nozzle body 227. Because each of the connections 248, 251 and 255 are secure connections, nozzle bodies may not shift or move with respect to one another to account for thermal expansion. Consequently, nozzle 224 lengthens and presses against the mold plate as nozzle bodies thermally expand. Thus, expansion pressure may result in contact between nozzle 224 and mold plate 234 and wearing at the point of contact therebetween. In the present invention, however, any wear is limited to the easily replaceable nozzle tip 254 which is in contact with mold plate 234, avoiding expensive and difficult replacement of the entire downstream nozzle body 227.

Nozzle tip 254, may be made of a material that is the same or different from the material of downstream nozzle body 227. For example, nozzle tip may be made from a material having a higher coefficient of thermal conductivity than the downstream nozzle body, such as copper. Preferably, nozzle tip is made from a material having good thermal and heat conductive characteristics, such as H13, tool steel or stainless steel. As such heat may be easily transferred from the adjacent downstream nozzle body 227, such that a separate heater is not needed in the nozzle tip 254.

Downstream nozzle body 227 also includes a flange 256 that extends in a radial direction from downstream end 253. Flange 256 has a tip 256a that contacts the mold plate 234 and positions downstream nozzle body 227 so that part of nozzle channel 225 formed by nozzle tip 254 is aligned with a mold gate 259 opening into a mold cavity (not shown). flange 256 may be made of a material with a lower thermal conductivity than the material of downstream nozzle body 227 in order to prevent heat loss to the mold plate 234 from downstream nozzle body 227.

To maintain melt in nozzle channel 255 at a consistent temperature, nozzle 224 has a first heater 258a embedded into upstream nozzle body 226 including a first electrical connection (not shown). A first thermocouple 263a for monitoring the temperature of upstream nozzle body 226 and for controlling first heater 258a is also embedded into upstream nozzle body 226. Nozzle 224 also includes a second heater 258b including a second electrical connection 262 and a second thermocouple 263b for monitoring the temperature of downstream nozzle body 227 and for controlling second heater 258b. Heaters are coiled closer together at the upstream and downstream end of a nozzle body and looser in the center of a nozzle body because heat loss from the nozzle body occurs via contact with other components at the upstream and downstream ends. For example, sufficient heat is transferred from downstream nozzle body 227 to nozzle tip 254 and further to mold plate 234 to require additional heat to a downstream end 253 of downstream nozzle body 227. Similarly, heat is lost at the upstream end of upstream nozzle body 226 by transfer to manifold 212.

Figure 5A:
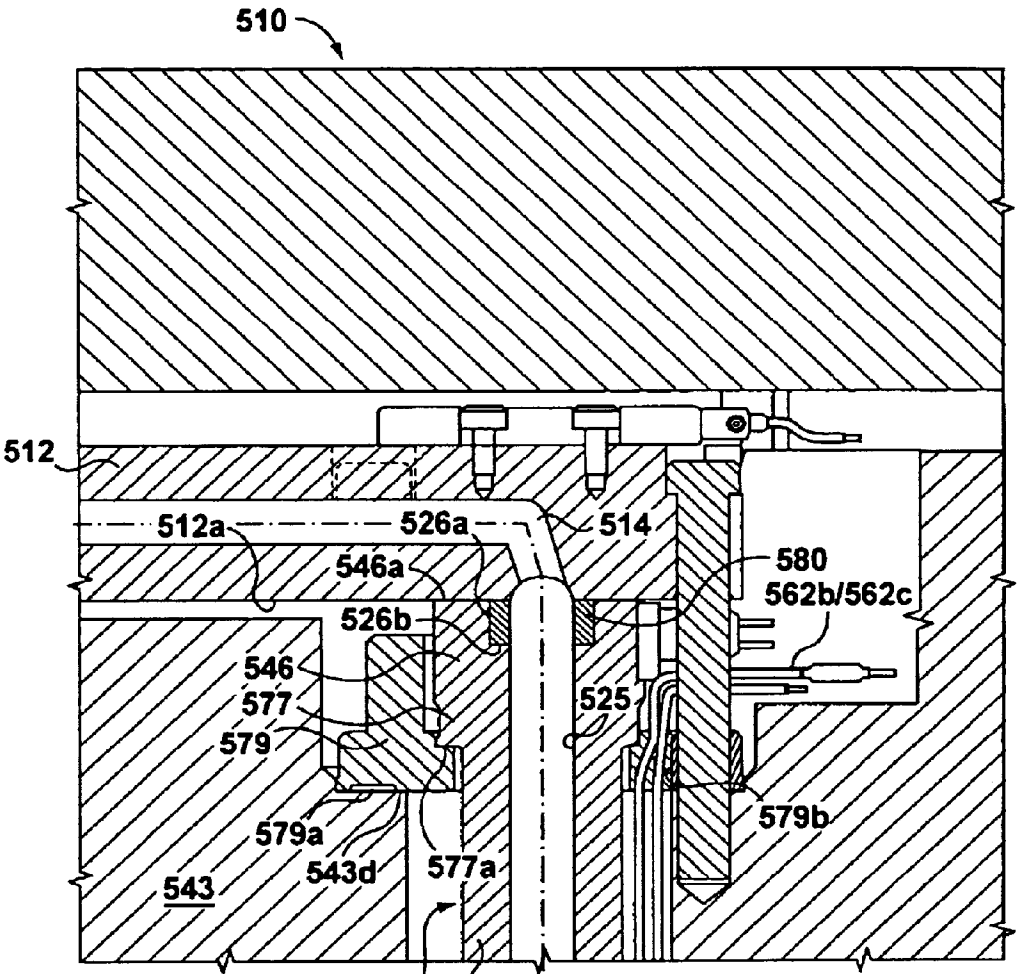
FIG. 5A illustrates an enlarged schematic cross-section of an alternate embodiment of an injection molding apparatus of the present invention including a nozzle positioned adjacent a manifold.
Figure 5B:
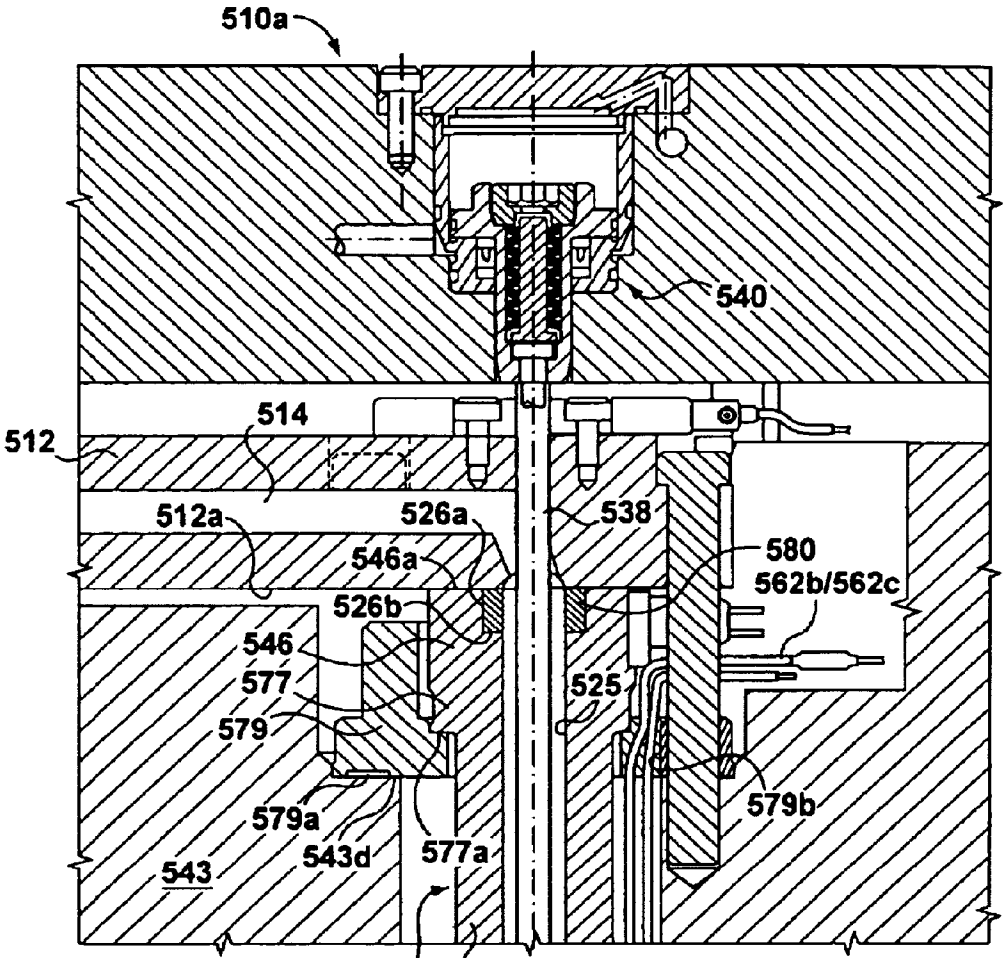
FIG. 5B illustrates an enlarge schematic cross-section of an alternate embodiment of an injection molding apparatus of the present invention including a valve gated nozzle positioned adjacent a manifold.

Nozzle 224 is a valve gated nozzle and includes a valve pin 238 that is driven by a valve actuator (not shown), typically a piston, such as that shown as reference number 540 in FIG. 5B. Each valve pin 238 is selectively movable to open and close the respective mold gates 259. Valve pin 238 running through nozzle channel 225 along the length of nozzle 224 is shown in a split view in FIG. 2 to demonstrate a retracted, or opened, position 238a and an extended, or closed, position 238b at the downstream end 253 of downstream nozzle 227. The downstream end 253 of downstream nozzle 227 also includes a valve pin guide 246 to help guide the valve pin into the mold gate 259. Valve pin guide 264 includes channels allowing melt to backflow past the valve pin 238 when it is extending to close mold gate 259.

Under certain conditions, a threaded connection, such as connections 248, 251, and 255, may suffer from thread galling. Thread galling occurs when pressure builds between the contacting and sliding thread surfaces during the process of fastening the threads together. Protective oxides are broken, possibly wiped off, and interface metal high points shear or lock together. In some cases, the shearing may cause the threads to freeze together, so that the connections cannot be unthreaded. Several methods are available to reduce thread galling, such as using threads of different materials. Thus, thread galling may be avoided by having upstream nozzle body 226 be a different material than downstream nozzle body 227. Alternatively, one set of the threads of connections 248, 251, 255 may be coated with a layer of a different material, preferably a lubricating material such as copper, copper alloys, graphite, bronze, brass, or other material as would be apparent to one skilled in the art.

Figure 3:
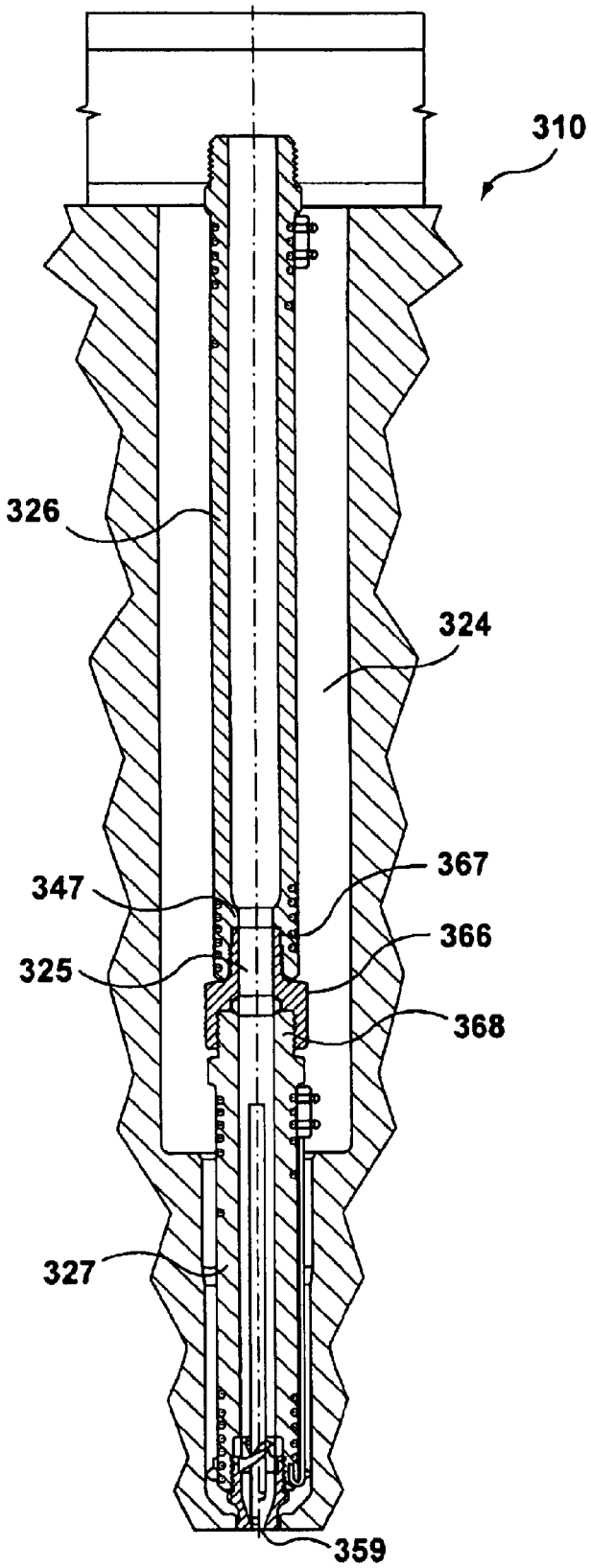
FIG. 3 illustrates a schematic cross-section of an alternate embodiment of an injection molding apparatus of the present invention including an alternate connection between tandem nozzle bodies.

An alternate embodiment of an injection molding apparatus 310 is shown in FIG. 3. This embodiment includes a spacer 366 which defines a portion of nozzle channel 325. Spacer 336 is one of several devices that may be used to couple upstream nozzle body 326 and downstream nozzle body 327. In this case, spacer 366 has an upstream threaded end 367 threaded into downstream end 347 of upstream nozzle body 326 and a downstream threaded end 368 threaded into an upstream end 368 of downstream nozzle body 327. Spacer 366 may provide threads of a different material than upstream nozzle body 326 and downstream nozzle body 327 to avoid thread galling. Depending upon the material it is made from, spacer 366 may act as an insulator to avoid heat transfer between upstream and downstream nozzle bodies 326, 327 or as a heat sink to avoid overheating in the center of nozzle 324.

Figure 4:
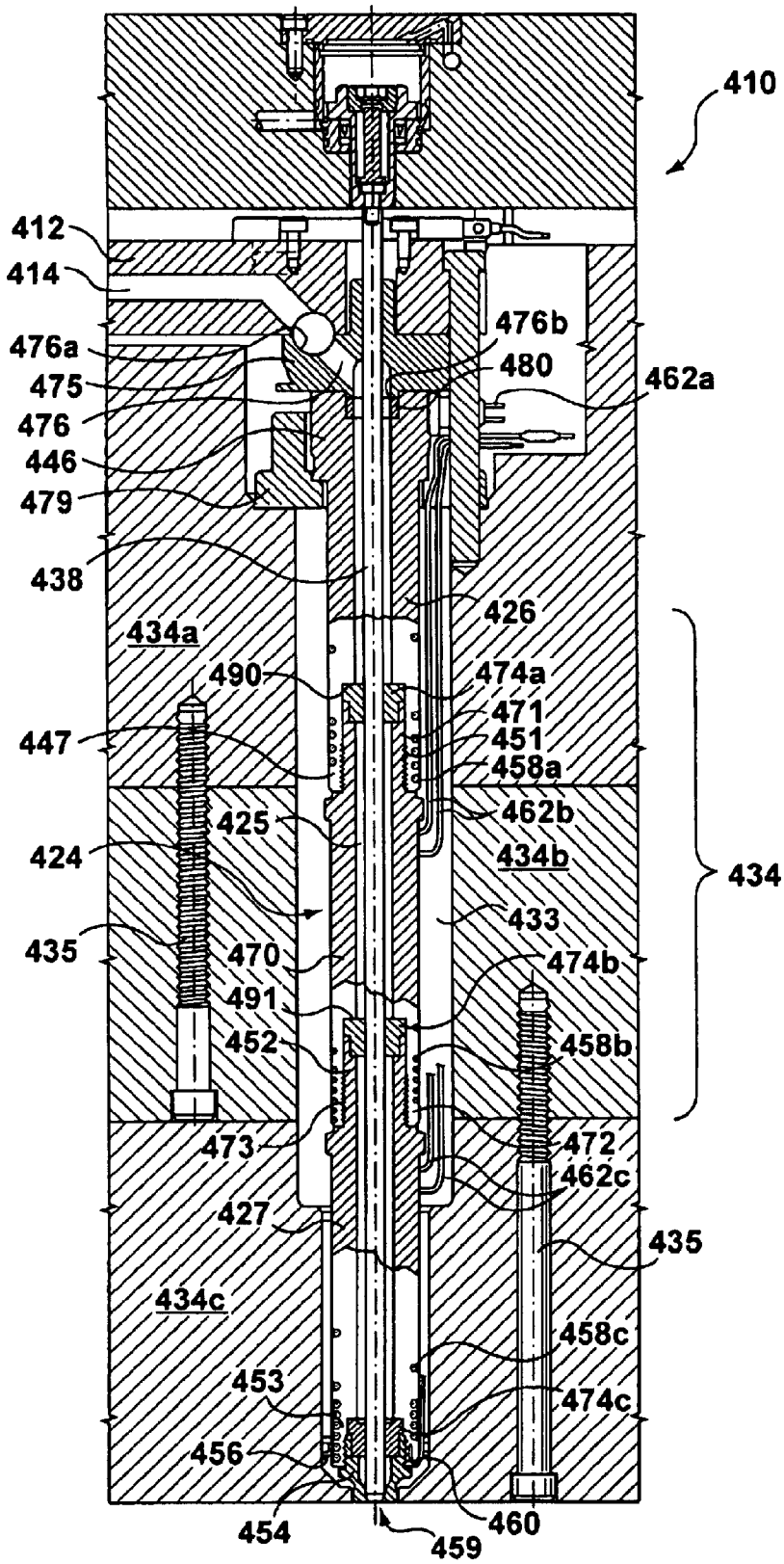
FIG. 4 illustrates a schematic cross-section of an alternate embodiment of an injection molding apparatus of the present invention including three nozzle bodies in tandem.

FIG. 4 shows another embodiment of an injection molding apparatus 410 of the present invention including nozzle 424 having three nozzle bodies, i.e., a upstream nozzle body 426, a downstream nozzle body 427 and an intermediate nozzle body 470. These nozzle bodies define a nozzle channel 425 fluidly connected to a manifold channel 413. FIG. 4 also show a split mold plate 434, similar to that shown in FIGS. 1A and 1B, including separate mold plates 434a, 434b and 434c. In another embodiment, another nozzle (not shown) connected to manifold 412 may be shorter and inject melt into a different mold cavity formed between mold plates 434a and 434b or between mold plates 434b and 434c; while, an extended nozzle, such as nozzle 424 injects melt into yet another mold cavity (not shown) formed below mold plate 434c. Mold plates 434a, 434b and 434c are pressed and held together during the molding process, such as by bolts 435, but released when the molded article has cured to eject the molded article formed therebetween. By using a split mold 434, one manifold 412 can inject melt into different molds on more than one linear plane, this being able to form more or larger molded articles with a single manifold 412. Split mold plate 434 may have more or less mold plates forming a variety of configurations in an injection molding apparatus of the present invention, as would be apparent to one skilled in the art.

As seen in FIG. 4, a downstream end 447 of upstream nozzle 426 is coupled to an upstream end 471 of intermediate nozzle body 470 by a threaded connection 451, and downstream end 472 of intermediate nozzle body 470 is coupled to an upstream end 452 of downstream nozzle body 427 by a threaded connection 473. Because of the length of an extended nozzle, such as nozzle 424, a small misalignment of the valve pin 438 in an upstream area of nozzle 424 may skew the valve pin so as to be greatly misaligned downstream at a mold gate 459. Thus, valve pin guides 474a, 474b and 474c may be positioned along the length of nozzle 424. For example, in FIG. 4, valve pin guided 474a is positioned in recess 490 formed by upstream nozzle body 426 and intermediate nozzle body 470 and is retained by threaded connection 451. Valve pin guide 474b is positioned similarly in a recess 491 between intermediate nozzle body 470 and downstream nozzle body 427 and retained by threaded connection 473. Valve guide 545(a) is positioned and retained, similar to valve pin guide 264 in FIG. 2, by nozzle tip 54.

Each of valve pin guides 474a, 474b and 474c comprise one or more channels therein (not shown) to allow melt to flow past each of valve pin guides 474a, 474b and 474c, while maintaining the alignment of the valve pin 438 in the center of nozzle channel 425 and aligned with mold gate 459. The valve pin guides may be made of the same material or a different material than that of nozzle bodies 426, 470 and 427. Further, the valve pin guides may be made of a material that has a high coefficient of thermal expansion. Therefore, as valve pin guides 474a and 474b thermally expand, each creates a seal and additional support for threaded connections 451 and 473. Further, downstream end 453 of downstream nozzle body 427 includes a flange 456 which contacts mold plate 434c to align nozzle 424 with mold gate 459, as discussed above with respect to FIG. 2.

To further guide the valve pin 438 and keep it aligned with mold gate 459, a pin support 475 is positioned between the upstream end 446 of upstream nozzle body 426 and manifold 412. Pin support 475 includes a melt channel 476 which is aligned and in fluid communication with manifold channel 414 at an upstream end 476a and which nozzle channel 425 at a downstream end 476b.

Nozzle 424 comprises heaters 458a, 458b and 458c, respectively embedded into nozzle bodies 426, 470, and 427, as well as electrical connections 462a, 462b, and 462c, respectively connected to heaters 458a, 458b and 458c. Nozzle 424 also includes thermocouples for monitoring the temperature of each of the nozzle bodies 426, 470 and 427 and for controlling each heaters 458a, 458b and 458c, such as thermocouple 460 shown embedded into downstream nozzle body 427 in FIG. 4.

Downstream nozzle body 427 includes a nozzle tip 454 inserted into a downstream end 453. Nozzle tip 454 is similar to nozzle tip 254 defined and described with respect to FIG. 2. As discussed above, nozzle 424 will elongate due to thermal expansion, upon which nozzle tip 454 will be pressed against mold plate 434c. Because nozzle tip 454 is removable, it can be easily replaced when this pressure causes wear to nozzle tip 454. Further, a separate heater for nozzle tip 454 is not necessary, as it is sufficiently heated by heat transferred from downstream nozzle body 427.

Upstream end 446 of upstream nozzle body 426 is not secured to pin support 475 by a threaded connection as discussed above with respect to FIG. 2. Instead, features of the arrangement between upstream nozzle body 426 and pin support 475 are discussed in detail below with respect to FIGS. 5A and 5B and with respect to FIG. 10 in U.S. patent application Ser. No. 10/357,420, filed Feb. 4, 2003 (now U.S. Pat. No. 6,860,732), which is incorporated herein by reference in its entirety.

FIGS. 5A and 5B are enlarged views of other injection molding apparatuses 510 and 510a, respectively, of the present invention. Injection molding apparatus 510 of FIG. 5A is not a valve gated injection molding apparatus, and thus does not include a pin support between a manifold 512 and an upstream end 546 of a upstream nozzle body 526. Meanwhile, FIG. 5B illustrates an injection molding apparatus which is valve gated, but without a pin support positioned between a manifold 512 and an upstream end 546 of upstream nozzle body 526.

In the embodiment of FIG. 5A, upstream end 546 includes an upstream surface 546a which abuts a downstream surface 512a of manifold 512 and a shoulder 577 extending in a radial direction. A sleeve 579 is located between a lower surface 577a of shoulder 577 and a contact surface 543d of the manifold plate 543. Sleeve 579 is made of a material having a low thermal conductivity, for example titanium or ceramic, to act as insulation to prevent heat transfer from upstream nozzle body 526 to mold plate 543. Sleeve 579 also includes a cavity 579a to limit the contact between sleeve 579 and contact surface 543d of mold plate 543, reducing the heat loss from upstream nozzle body 526 even further. As would be apparent to one of ordinary skill in the art, sleeve 579 positions and aligns upstream nozzle body 526, and thus nozzle 524, with respect to manifold 512 and a mold gate. Sleeve 579 also includes an opening 579b through which leads for electrical connections 562b/562c extend to be externally connected to a power source.

Upstream end 546 of upstream nozzle body 526 includes a recess 526a that is formed in upstream surface 546a. The recess 526a is delimited by a shoulder 526b. A sealing insert 580 defining a portion of nozzle channel 525 is nested in recess 526a. When injection molding apparatus 510 is in a cold condition a clearance (not shown) is provided between sealing insert 580 and downstream surface 512a of manifold 512.

Sealing insert 580 has a higher coefficient of thermal expansion than both manifold 512 and upstream nozzle body 526, which are typically comprised of tool steels such as H13 or P20 steel, for example. Sealing insert 580 may be comprised of copper, beryllium copper, brass, carbide or some steels. Alternatively, any suitable material having a higher coefficient of thermal expansion than manifold 512 and upstream nozzle body 526 may be used for sealing insert 580.

In operation, the injection molding apparatus 510 starts in the cold condition, in which all of the components are at generally the same ambient temperature. During operation, manifold 512 and multiple nozzle bodies, such as upstream nozzle body 526, are heated and maintained at their respective temperatures so that the melt stream may flow unhindered into a melt cavity, which is chilled. As injection molding apparatus 510 is heated to operating temperature (as shown in FIGS. 5A and 5B), sealing insert 580 expands. Because sealing insert 580 has a higher coefficient of thermal expansion, the length of sealing insert 580 increases by a larger amount than the surrounding components, including upstream end 546 of upstream nozzle body 526 and manifold 512. As such, sealing insert 580 applies a sealing force to downstream surface 512a of manifold 512. The expansion of the sealing insert 580 may, in fact, cause upstream surface 546a of upstream nozzle body 526 and downstream surface 512a of manifold 512 to push apart slightly, however, fluid communication between the components is sealed, providing a continuous, sealed path for melt to flow between manifold channel 514 and nozzle channel 225.

Further, since there is no secured connection between manifold 512, upstream nozzle body 526 and sleeve 579, these components can shift upon thermal expansion to relieve some of the pressure created by the secured connections between the plurality of nozzle bodies due to thermal expansion.

Returning to FIG. 4, sleeve 479 positions and aligns upstream nozzle body 426 and thus nozzle 424 with respect to manifold 412, pin support 475 and mold gate 459. Sleeve 479 and sealing ring 480 operate as discussed above with respect to sleeve 579 and sealing ring 580 of FIG. 5A, except that sealing ring 580 creates a seal with respect to pin support 475 instead of directly with manifold 412. Similarly, FIG. 5B, illustrates a valve gated injection molding apparatus 510a, including a valve pin 538, however, without a pin support. Upstream end 546 of upstream nozzle body 526 is further positioned with respect to manifold 512 via having sleeve 579 and seal insert 580, as discussed above with respect to FIG. 5A. FIG. 5B also shows an actuator 540 for retracting and extending valve pin 538 within a nozzle channels 525. Actuator 540 is a hydraulic or pneumatic piston that moves up and down via pressure changes created as a fluid flows in an out of the actuator via lines 541.

Figure 6:
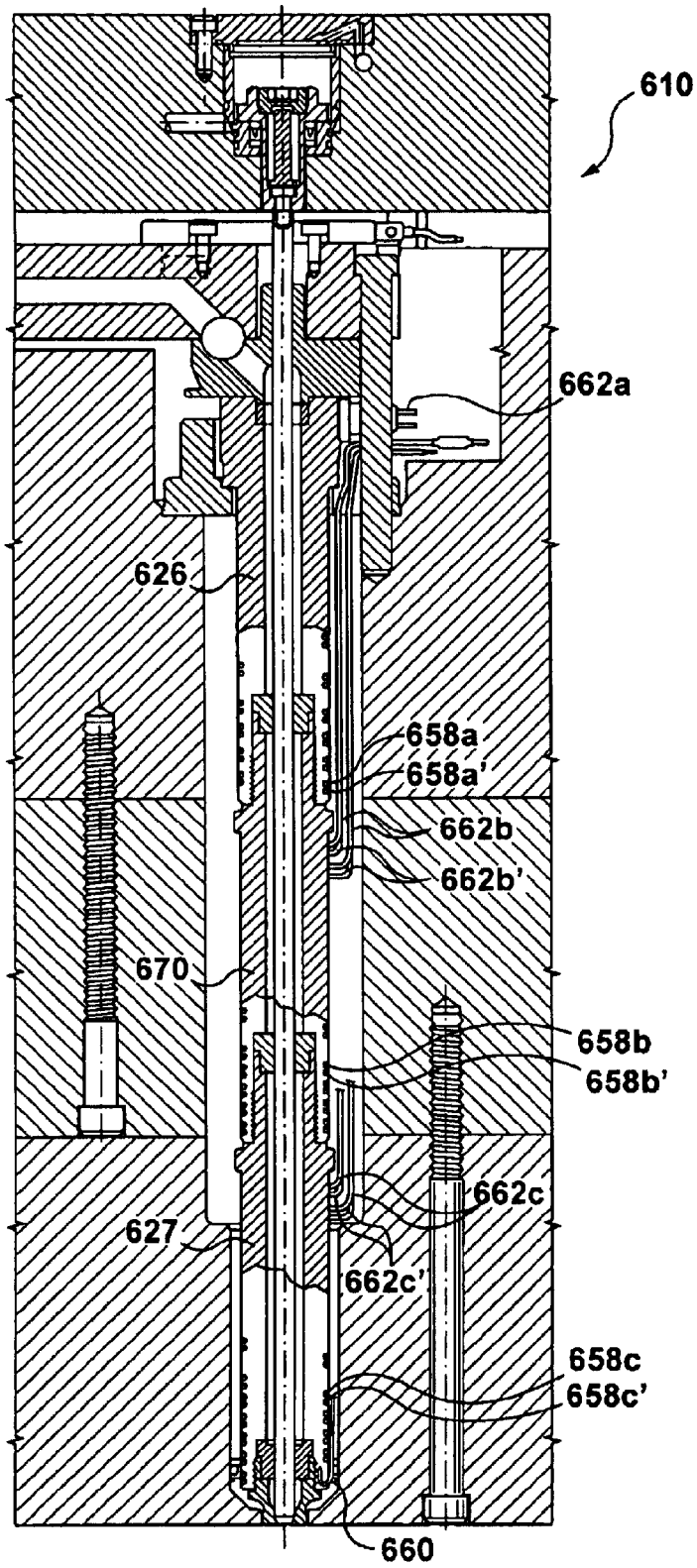
FIG. 6 illustrates a schematic cross-section of an alternate embodiment of an injection molding apparatus of the present invention including double heaters.

FIG. 6 shows another injection molding apparatus 610 of the present invention. Injection molding apparatus 610 is similar to injection molding apparatus of FIG. 4, except that each of an upstream nozzle body 626, an intermediate nozzle body 670, and a downstream nozzle body 627 includes at least two independent heaters embedded therein, respectively. For example, heaters 658a and 658a' are embedded into upstream nozzle body 626. Although not shown in FIG. 6, heaters 658a and 658a' are both connected via separate electrical connections, such as electrical connection 662a. Similarly, intermediate nozzle body 670 has embedded therein heaters 658b and 658b', with electrical connections 662b and 662b', respectively. Finally, heaters 658c and 658c' are embedded into downstream nozzle body 627, with electrical connections 662c and 662c', respectively. Having two or more heaters embedded in a nozzle body adds additional heat to the nozzle bodies. Further, each of nozzle bodies 626, 670 and 627 also include an embedded thermocouple for monitoring the temperature of the nozzle body and for controlling heaters 658a, 658a', 658b, 658b', 658c and 658c', such as thermocouple 660 embedded into downstream nozzle body 627 shown in FIG. 6.

Figure 7:
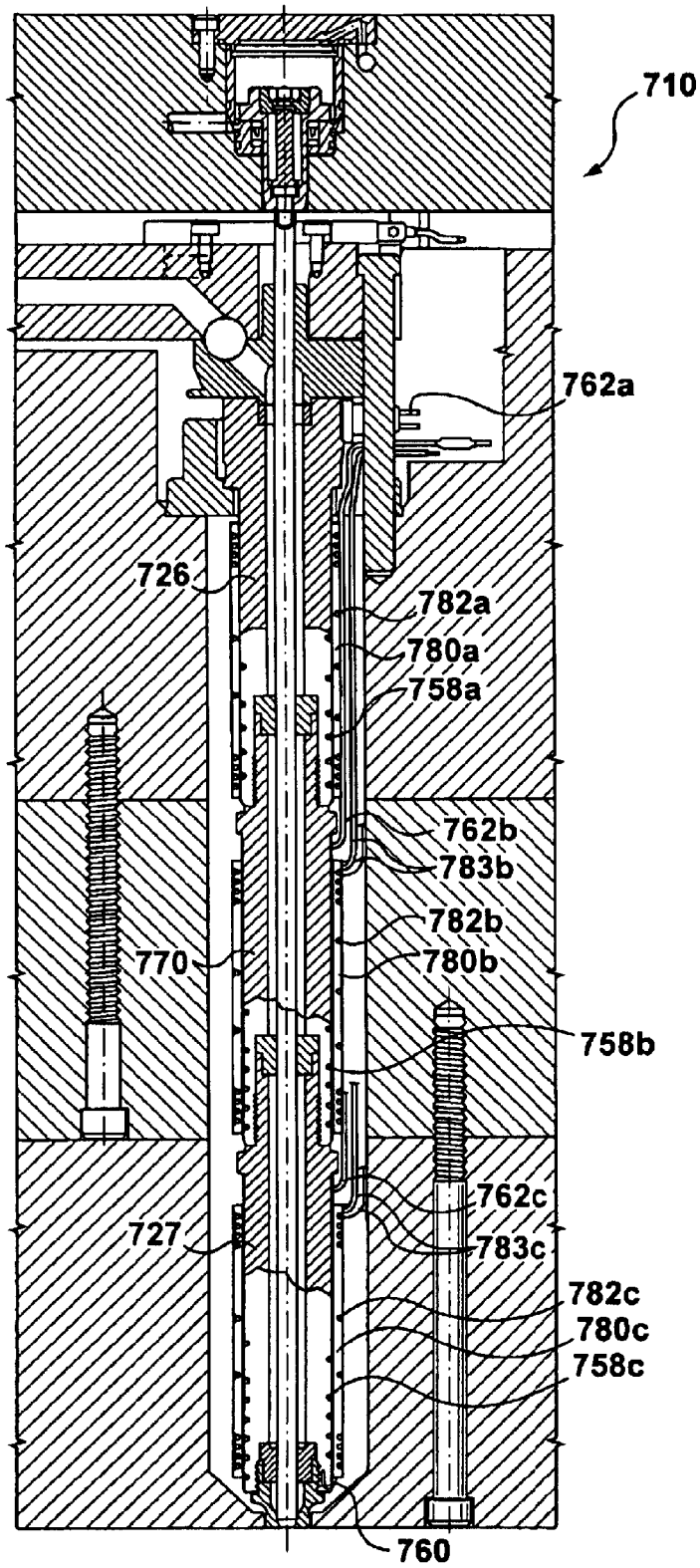
FIG. 7 illustrates a schematic cross-section of an alternate embodiment of an injection molding apparatus of the present invention including heating bands.

FIG. 7 shows another injection molding apparatus 710 of the present invention. In this embodiment, injection molding apparatus 710 is also similar to injection molding apparatus of FIG. 4, except that an upstream nozzle body 726, an intermediate nozzle body 770 and a downstream nozzle body 727 are each surrounded by heating bans 780a, 780b and 780c, respectively. Embedded within heating bands 780a, 780b and 780c', are heaters 782a, 782b and 782c, respectively. Heating bands supplement that heat provided to nozzle bodies 726, 770 and 772 by heaters 758a, 758b and 758c, respectively, which are embedded within the nozzle bodies. Heating bands may be made from a different material, preferably a high thermally conductive material, and may be attached to the nozzle bodies by a mechanical means such as welding or brazing or by another method apparent to one skilled in the art. Further, heating band heaters 782a, 782b, and 782c have separate electrical connections, i.e., a connection (not shown) for band heater 782a and connections 783b and 783c for band heaters 782b and 782c, respectively, than the electrical connections 762a, 762b, and 762c for heaters 758a, 758b and 758c, as shown in FIG. 7. Finally, the temperature of each nozzle body 726, 770 and 727 is monitored by, and both heating band heaters 782a, 782b and 782c and heaters 758a, 758b and 758c are controlled by, thermocouple place in each nozzle body, such as thermocouple 760 embedded into downstream nozzle body 727, as shown in FIG. 7.

Figure 8A:
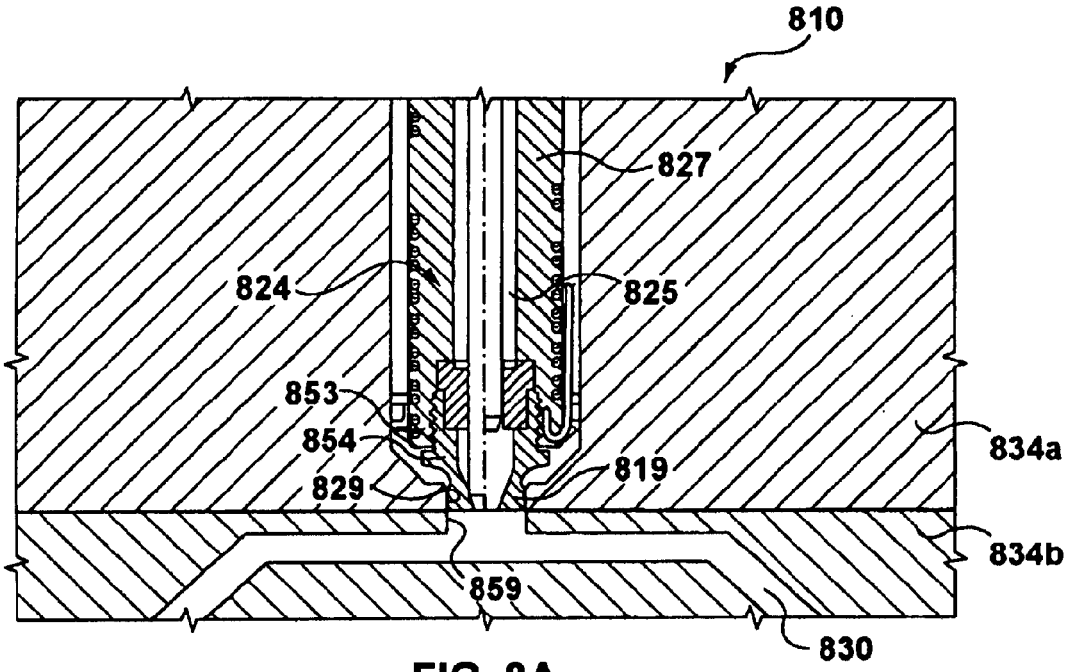
FIG. 8A illustrates an enlarged schematic cross-section of an alternate embodiment of an injection molding apparatus of the present invention including a nozzle tip positioned adjacent a mold gate at a cold non-operational temperature.
Figure 8B:
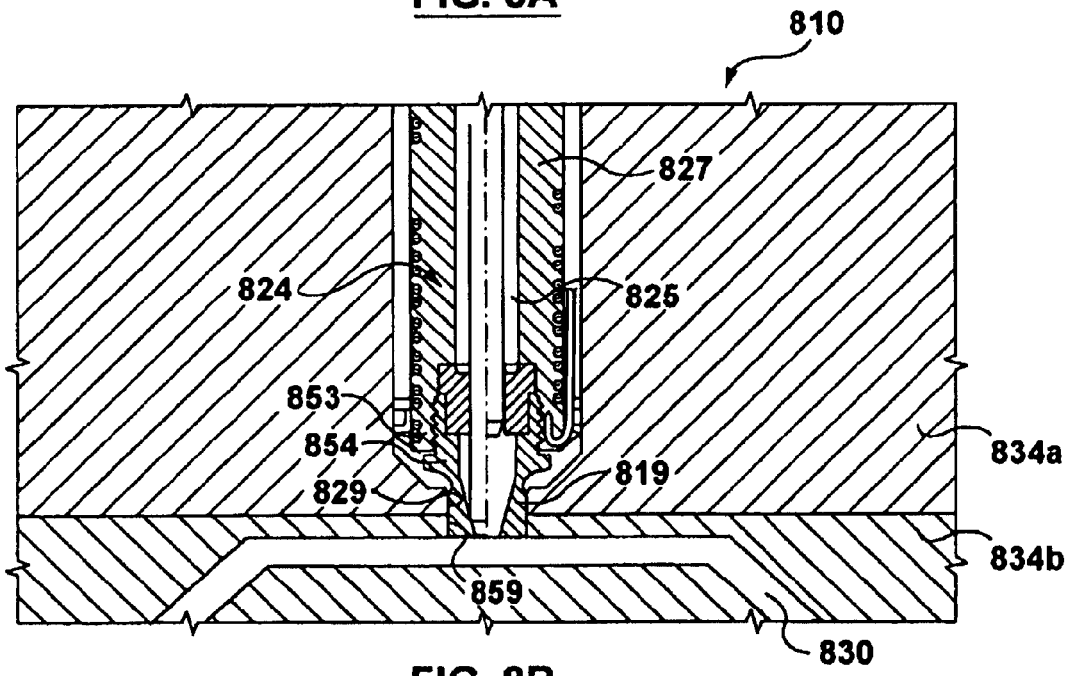
FIG. 8B illustrates an enlarged schematic cross-section of an alternate embodiment of an injection molding apparatus of the present invention including a nozzle tip positioned adjacent a mold gate when heated to an operational temperature.

FIGS. 8A and 8B illustrate an aspect of yet another embodiment of an injection molding apparatus 810 of the present invention. FIGS. 8A and 8B illustrate an enlarged view of a downstream nozzle body 827 of a nozzle 824.

A nozzle tip 854, retained in a downstream end 853 of downstream nozzle body 827 by a second connection, has an extended portion 819. Extended portion 819 slidably fits into a bore 829 in mold plate 834a which is aligned with mold gate 859 in mold plate 834b. The extended portion 819 aligns downstream nozzle body 827, and thus nozzle channel 825, with mold gate 859. FIG. 8A shows the position of nozzle tip 854, when the injection molding apparatus is not being operated and is cold. During operation of injection molding apparatus 810, nozzle 824 thermally expands. As it does, nozzle tip 954 slides with respect to mold plates 834a, and 843b, and extended portion 819 of nozzle tip 854 expands into mold gate 859, as shown in FIG. 8B. Thus, the slidable coupling between nozzle tip 854 and mold plates 834a and 834b relieves the pressure caused by the secure connection between nozzle bodies in tandem. Extended portion 819 also expands in a radial direction, which is perpendicular to the flow of the melt stream, forming a seal with mold plates 834a and 834b to prevent leaking of the melt stream.

While the invention has been particularly shown and described with reference to preferred embodiments thereof, it will be understood by those skilled in the art that they have been presented by way of example only, and not limitation, and various changes in form and details can be made therein without departing from the spirit and scope of the invention. For example, multiple nozzle bodies can be used in an injection molding apparatus of the present invention. As such, the number of nozzle bodies is not limited to either two or three as shown in the figures.

Thus, the breadth and scope of the present invention should not be limited by any of the above-described exemplary embodiments, but should be defined only in accordance with the following claims and their equivalents. Additionally, all references cited herein, including issued U.S. patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. An injection molding apparatus, comprising:

a hot runner manifold including at least two manifold channels;

at least two nozzles, each of said at least two nozzles defining a nozzle channel in fluid communication with a respective one of said at least two manifolds channels;

at least one of said at least two nozzles including nozzle bodies coupled together said nozzle bodies including at least an upstream nozzle body having an upstream end adjacent said manifold channel and a downstream end, and a downstream nozzle body having a downstream end adjacent a mold plate and an upstream end directly adjacent the downstream end of the upstream nozzle body;

a separate and removable nozzle tip retained in said downstream end of said downstream nozzle body; and another nozzle tip coupled to another one of said at least two nozzles.

2. The injection molding apparatus of claim 1, further comprising a threaded connection configured to removably couple said nozzle bodies.

3. The injection molding apparatus of claim 2, wherein said threaded connection includes a first set of threads and a second set of threads, wherein said first set of threads are made of a material that is different from said second set of threads.

4. The injection molding apparatus of claim 2, wherein at least one of said upstream body or downstream nozzle body includes threads made from a material that is different from said nozzle bodies.

5. The injection molding apparatus of claim 1, wherein at least one of said nozzles includes an intermediate nozzle body, wherein an upstream end of said intermediate nozzle body is removably fastened to said downstream end of said upstream nozzle body and a downstream end of said intermediate nozzle body is removably fastened to said upstream end of said downstream nozzle body.

6. The injection molding apparatus of claim 1, wherein said nozzle tip is configured to be retained in said downstream nozzle body by a removably fastened connection.

7. The injection molding apparatus of claim 6, wherein said nozzle tip is configured to be retained in said downstream nozzle body via a threaded connection.

8. The injection molding apparatus of claim 1, wherein each of said nozzle bodies includes a heater attached thereto.

9. The injection molding apparatus of claim 8, wherein said nozzle tip does not have a heater attached directly thereto.

10. The injection molding apparatus of claim 1, wherein said upstream end of said upstream nozzle body is threadably connected to said manifold.

11. The injection molding apparatus of claim 1, wherein said upstream end of said upstream nozzle body is slidably connected with said manifold.

12. The injection molding apparatus of claim 1, wherein at least one of said at least two nozzles includes a valve pin and an actuator, the actuator configured for extending and retracting said valve pin.

13. The injection molding apparatus of claim 12, wherein said at least one of said at least two nozzles includes at least one valve pin guide.

14. The injection molding apparatus of claim 12, wherein a pin support is disposed between said upstream end of said upstream nozzle body and said hot runner manifold.

15. The injection molding apparatus of claim 1, wherein said nozzle tip is made from a different material than said nozzle bodies.

16. The injection molding apparatus of claim 15, wherein the material making up said nozzle tip has a high thermal conductivity.

17. The injection molding apparatus of claim 1, wherein the mold plate comprises a split mold plate that includes a plurality of mold plates.

18. The injection molding apparatus of claim 1, wherein said nozzle tip includes an extended portion that is slidable within a bore in said mold plate.

19. An injection molding apparatus, comprising:

a manifold defining at least two manifold channels;

at least two nozzles, each of said at least two nozzles defining a nozzle channel in fluid communication with a respective one of said at least two manifold channels an coupled to respective nozzle tips; and at least one of said at least two nozzles including at least two nozzle bodies, the at least two nozzle bodies including an upstream nozzle body directly connected in tandem with a downstream nozzle body via a removably fastened connection, a respective one of the nozzle tips being disposed in a downstream end of said downstream nozzle body;

wherein each of said at least two nozzle bodies includes at least one heater attached thereto, and wherein each of said nozzle tips does not have a separate heater connected directly thereto.

20. The injection molding apparatus of claim 19, wherein each of said at least two nozzle bodies has a first heater at least partially embedded therein.

21. The injection molding apparatus of claim 20, wherein each of said nozzle bodies includes at least two heaters.

22. The injection molding apparatus of claim 21, wherein each of said nozzle bodies includes a second heater at least partially embedded therein.

23. The injection molding apparatus of claim 20, wherein at lest one of said nozzle bodies includes a second heater embedded in a heating band coupled to said nozzle body.

24. A manifold injection molding apparatus, comprising:

a manifold defining at least two manifold channels;

at least two nozzles, each of said nozzles defining a nozzle channel in fluid communication with a respective one of said at manifold channels; and at least one of said nozzles including at least two nozzle bodies, including at least a upstream nozzle body and a downstream nozzle body removably fastened in tandem;

wherein each of said nozzle bodies includes at least a first heater and a second hater, wherein each of at least said first heater is embedded into each of said nozzle bodies.

25. The injection molding apparatus of claim 24, wherein each of said second heater is embodied in a heating band surrounding an outside surface of each of said nozzle bodies.

26. The injection molding apparatus of claim 25, wherein said heating band comprises a material having a high thermal conductivity.

27. The injection molding apparatus of claim 24, wherein each of said first heater and said second heater have separate electrical connections extending therefrom.

28. The injection molding apparatus of claim 24, wherein said downstream nozzle body includes an electrical connection for at least one of said first and second heaters with leads exiting said injection molding apparatus through a bore between a first and second mold plate.

29. The injection molding apparatus of claim 24, wherein said downstream nozzle body includes an electrical connection for at least one of said first and second heaters with leads drawn along an opening in a mold plate into which said nozzle is inserted.

30. The injection molding apparatus of claim 24, wherein a nozzle tip is disposed in a downstream end of said downstream nozzle body.

31. The injection molding apparatus of claim 30, wherein said nozzle ti is not heated by a separate hater attached directly thereto.

32. The injection molding apparatus of claim 24, wherein both said first heater and said second heater are embedded in each of said nozzle bodies.

33. An injection molding nozzle apparatus, comprising:

first and second nozzles each during a nozzle channel that is in fluid communication with corresponding in first and second manifold channels of a hot runner manifold, at least one of the first and second nozzles including upstream and downstream nozzle bodies coupled together, the upstream nozzle body having an upstream end adjacent the manifold channel and the downstream nozzle body having a downstream end adjacent a mold plate;

removable nozzle tips coupled to each of the first and second nozzles; and a spacer having a first end threaded to the upstream nozzle body and a second end threaded to the downstream nozzle body.

34. The injection molding nozzle apparatus of claim 33, wherein said spacer is made from a different material than said upstream and said downstream nozzle bodies.

*35. The injection molding nozzle apparatus of claim 34, wherein said spacer is an insulator.*

*36. The injection molding nozzle apparatus of claim 34, wherein said spacer is a heat sink.*

*37. An injection molding apparatus comprising:*

*a manifold having a manifold channel;*

*a nozzle having a nozzle body including an upstream nozzle body, a downstream nozzle body, and a spacer disposed between said upstream nozzle body and said downstream nozzle body such that said upstream nozzle body, said downstream nozzle body, and said spacer collectively define a nozzle channel in fluid communication with said manifold channel, wherein said spacer is connected to said downstream nozzle body such that said spacer is not movable relative to said downstream nozzle body, and wherein said upstream and downstream nozzle bodies are heated and said spacer is devoid of a nozzle heater; and*

*a nozzle tip coupled to the downstream nozzle body, said nozzle tip for receiving melt from said nozzle channel and delivering the melt to a mold cavity.*

*38. The injection molding apparatus of claim 37, further comprising:*

*a first thermocouple coupled to said upstream nozzle body; and*

*a second thermocouple coupled to said downstream nozzle body.*

*39. The injection molding apparatus of claim 37, wherein said spacer is removably connected to at least one of said upstream nozzle body and said downstream nozzle body.*

*40. The injection molding apparatus of claim 37, wherein said spacer is made from a material such that it acts as a heat sink.*

*41. The injection molding apparatus of claim 37, wherein said spacer is made from a material such that it acts as an insulator to avoid heat transfer between said upstream nozzle body and said downstream nozzle body.*

*42. The injection molding apparatus of claim 37, wherein said spacer is connected to said downstream nozzle body using a threaded connection.*

*43. The injection molding apparatus of claim 37, wherein said spacer is connected to said upstream nozzle body using a threaded connection and is connected to said downstream nozzle body using a threaded connection.*

*44. The injection molding apparatus of claim 37, wherein said nozzle tip is a single nozzle tip.*

*45. A nozzle for use in an injection molding apparatus having a manifold and a mold gate, said nozzle comprising:*

*a first nozzle body disposed adjacent the manifold having a first melt channel;*

*a spacer having a spacer melt channel; and*

*a second nozzle body disposed adjacent the mold gate and having a second melt channel, said spacer being disposed between said first nozzle body and said second nozzle body such that said first, second and spacer melt channels collectively define a nozzle melt channel,*

*wherein said spacer is connected to said second nozzle body such that said spacer is not slidable relative to said second nozzle body, and wherein said first and second nozzle bodies are heated and said spacer is devoid of a nozzle heater.*

*46. The nozzle of claim 45, wherein said spacer is removably connected to at least one of said first nozzle body and said second nozzle body.*

*47. The nozzle of claim 45, wherein said spacer is made from a material such that it acts as a heat sink.*

*48. The injection molding apparatus of claim 45, wherein said spacer is made from a material such that it acts as an insulator.*

*49. The nozzle of claim 45, wherein said spacer is connected to said second nozzle body via a threaded connection.*

*50. The nozzle of claim 45, wherein said spacer is connected to said first nozzle body using a threaded connection and is connected to said second nozzle body using a threaded connection.*

*51. An injection molding apparatus having a plurality of mold gates, said apparatus comprising:*

*a manifold; and*

*a plurality of nozzles disposed between said manifold and the mold gates, wherein at least one of said plurality of nozzles has a nozzle body including an upstream nozzle body adjacent said manifold, a spacer, and a downstream nozzle body adjacent one of the mold gates, said spacer disposed between said upstream nozzle body and said downstream nozzle body, and wherein at least two of said nozzles are of different lengths,*

*wherein said upstream and downstream nozzle bodies of said at least one nozzle are heated and said spacer does not have a heater in contact with it.*

*52. The injection molding apparatus of claim 51, wherein at least two of said nozzles are in fluid communication with separate mold cavities.*

*53. The injection molding apparatus of claim 51, wherein said spacer is connected to each of said upstream and downstream nozzle bodies using a threaded connection.*

*54. An injection molding apparatus comprising:*

*a manifold having a heater and a manifold melt channel for distributing melt from a manifold inlet to a plurality of manifold outlets;*

*a nozzle having a nozzle melt channel, the nozzle being coupled to the manifold for receiving the melt from a manifold outlet, the nozzle including:*

*an upstream nozzle body forming a portion of said nozzle melt channel,*

*a downstream nozzle body forming a portion of said nozzle melt channel,*

*a spacer forming a portion of said nozzle melt channel and disposed between said upstream and downstream nozzle bodies such that said upstream nozzle body, said downstream nozzle body, and said spacer are coupled together along a common axis, wherein said spacer is made from a material such that it acts as an insulator as compared to said upstream and downstream nozzle bodies, and*

*a heater coupled to said upstream and downstream nozzle bodies; and*

*a nozzle tip coupled to a downstream end of said downstream nozzle body, said nozzle tip for receiving the melt from said nozzle melt channel and delivering the melt to a mold cavity.*

*55. The injection molding apparatus of claim 54, wherein said upstream and downstream nozzle bodies are made of the same material.*

*56. The injection molding apparatus of claim 55, wherein said upstream and downstream nozzle bodies are made of steel.*

*57. The injection molding apparatus of claim 54, wherein said nozzle heater comprises a first heater coupled to said upstream nozzle body and a second heater coupled to said downstream nozzle body.*

*58. The injection molding apparatus of claim 57, further comprising a first thermocouple coupled to said upstream nozzle body and a second thermocouple coupled to said downstream nozzle body.*

*59. The injection molding apparatus of claim 58, wherein said first heater and said second heater are independently controllable.*

*60. The injection molding apparatus of claim 54, wherein an upstream end of said spacer is directly connected to a downstream end of said upstream nozzle body, and a downstream end of said spacer is directly connected to an upstream end of said downstream nozzle body.*

*61. The injection molding apparatus of claim 60, wherein said spacer is connected to said upstream and downstream nozzle bodies by threads.*

*62. The injection molding apparatus of claim 54, wherein said spacer is coupled to said upstream and downstream nozzle bodies by threads.*

*63. An injection molding apparatus comprising:*

*a manifold having a heater and a manifold melt channel for distributing melt from a manifold inlet to a plurality of manifold outlets;*

*a nozzle having a nozzle melt channel, said nozzle being coupled to said manifold for receiving the melt from a manifold outlet, said nozzle including:*

*an upstream nozzle body forming a portion of said nozzle melt channel,*

*a downstream nozzle body forming a portion of said nozzle melt channel,*

*a spacer forming a portion of said nozzle melt channel, said spacer being disposed between and coupled to said upstream and downstream nozzle bodies such that the spacer substantially limits heat transfer between said upstream nozzle body and said downstream nozzle body, and*

*a heater coupled to said upstream and downstream nozzle bodies; and*

*a nozzle tip coupled to a downstream end of said downstream nozzle body, said nozzle tip for receiving the melt from said nozzle melt channel and delivering the melt to a mold cavity.*

*64. The injection molding apparatus of claim 63, wherein said spacer is formed from an insulative material.*

*65. The injection molding apparatus of claim 63, wherein said upstream and downstream nozzle bodies are made of the same material.*

*66. The injection molding apparatus of claim 65, wherein said upstream and downstream nozzle bodies are made of steel.*

*67. The injection molding apparatus of claim 63, wherein said spacer is coupled to said upstream and downstream nozzle bodies by threads.*

* * * * *